Dec. 1, 1959

R. G. EDGERTON 2,914,960

SPEED CONTROL ATTACHMENT

Filed July 6, 1956

Roy G. Edgerton
INVENTOR.

BY *Clarence A. O'Brien*
*and Harvey B. Jacobson*
Attorneys

Dec. 1, 1959 R. G. EDGERTON 2,914,960
SPEED CONTROL ATTACHMENT
Filed July 6, 1956 4 Sheets-Sheet 2

Roy G. Edgerton
INVENTOR.

BY *(signatures)*
Attorneys

Dec. 1, 1959  R. G. EDGERTON  2,914,960
SPEED CONTROL ATTACHMENT
Filed July 6, 1956  4 Sheets-Sheet 3
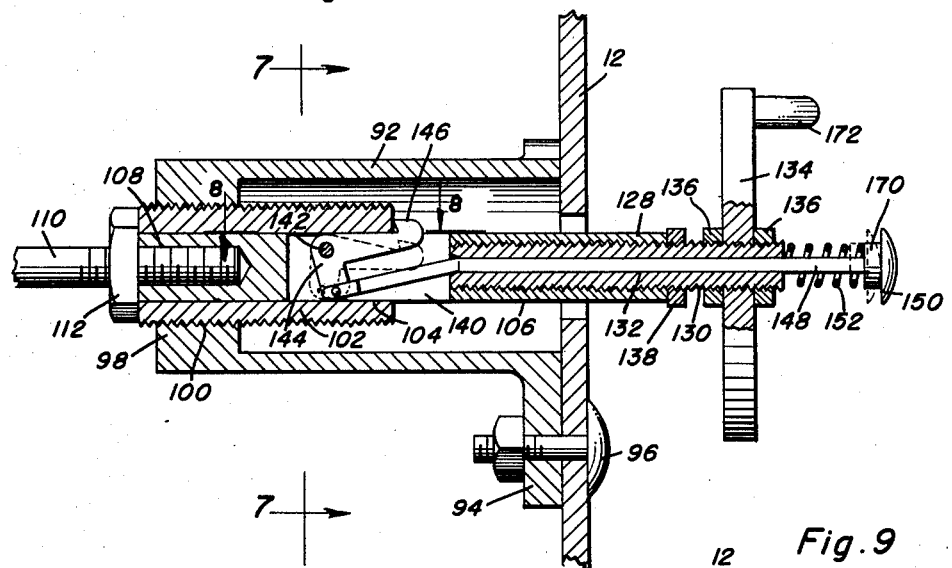
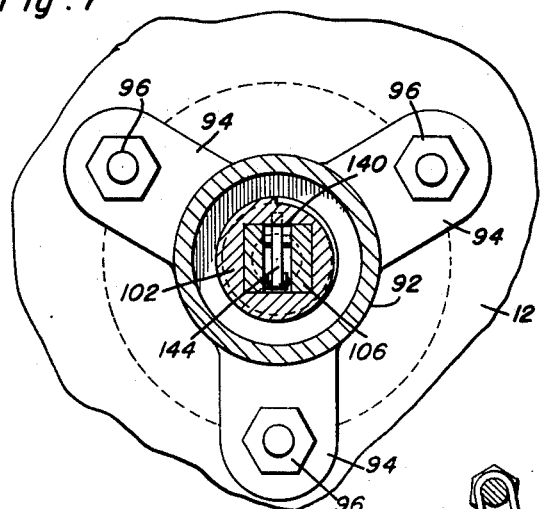
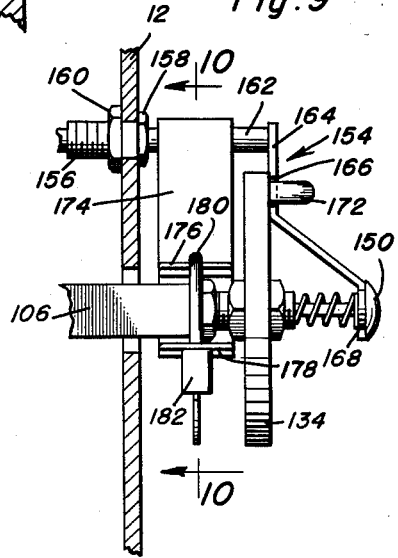
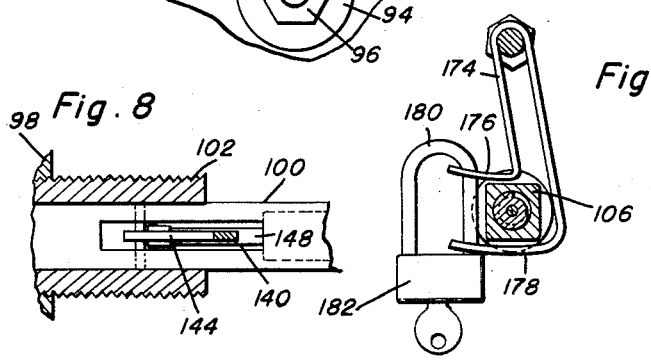
Roy G. Edgerton
INVENTOR.

Dec. 1, 1959  R. G. EDGERTON  2,914,960
SPEED CONTROL ATTACHMENT
Filed July 6, 1956  4 Sheets—Sheet 4
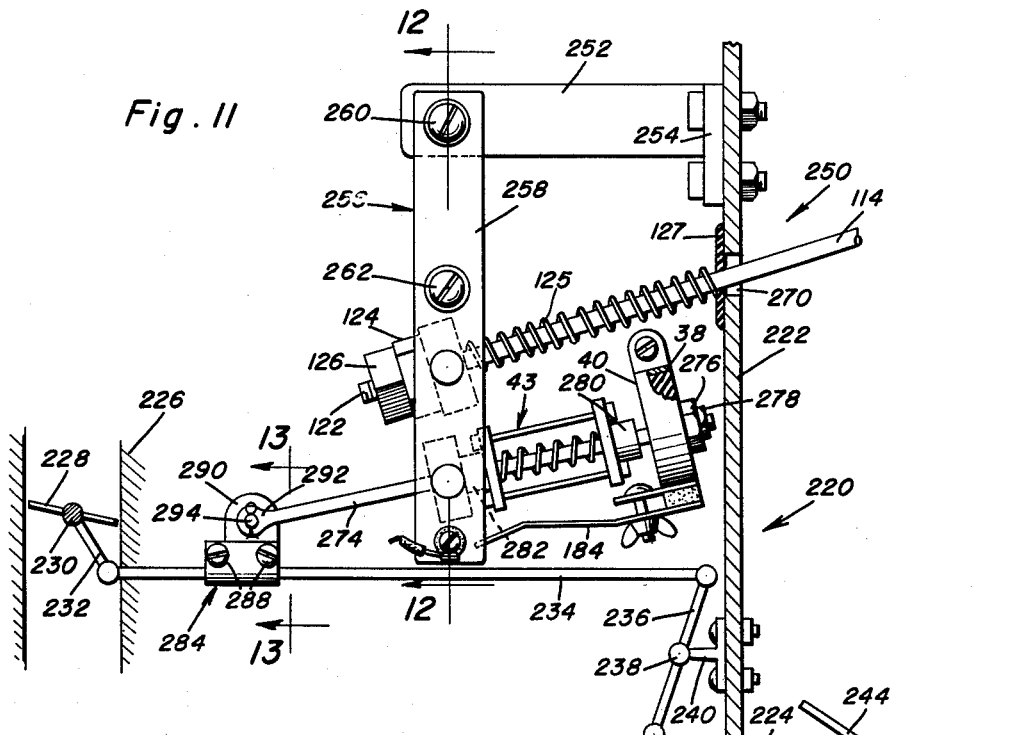
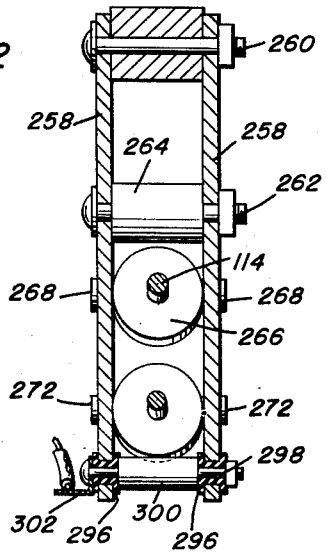
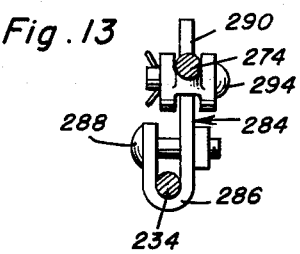
Roy G. Edgerton
INVENTOR.

United States Patent Office 2,914,960
Patented Dec. 1, 1959

2,914,960

SPEED CONTROL ATTACHMENT

Roy G. Edgerton, Miami, Fla.

Application July 6, 1956, Serial No. 596,345

5 Claims. (Cl. 74—526)

This invention relates in general to new and useful engine control devices for automotive vehicles, and more specifically to an improved speed control attachment.

The primary object of this invention is to provide an improved attachment which may be attached to a fuel control system of a vehicle for the purpose of limiting the maximum speed of the vehicle with the control attachment being overridable when needed for passing, accelerating, and for going up short hills so that the control attachment normally restricts the maximum speed of the vehicle and at the same time in no way deters from the control of such vehicle.

Another object of this invention is to provide an improved speed control attachment for vehicles, the speed control attachment being of such a nature whereby it may be secured on a fuel control link of a vehicle and limit the movement of such link as desired, there being provided a suitable adjustment for the speed control attachment which permits the maximum speed to be varied as desired by the operator of the vehicle.

Still another object of this invention is to provide an improved speed control attachment for vehicles, the speed control attachment being in the form of a stop for limiting the movement of a fuel control link, the stop being resiliently mounted so as to be overridable when desired or deemed necessary.

A further object of this invention is to provide an improved fuel control attachment whereby the speed of a vehicle so equipped may be controlled, the fuel control attachment including a spring mounted stop for limiting movement of a fuel control link, the stop forming a natural support for the accelerator pedal of the vehicle so as to make the driving of the vehicle at a predetermined maximum speed comfortable and the stop being resiliently mounted so as to permit overriding for passing, accelerating, etc.

A still further object of this invention is to provide an improved speed control attachment for vehicles, the speed control attachment being provided with a dial type adjustment whereby it may be readily set at the desired speed.

Yet a further object of this invention is to provide a speed control attachment which is overridable, there being connected to the speed control attachment a signal device which is actuated upon the overriding of the speed control attachment whereby the operator of the vehicle is warned.

A still further object of this invention is to provide an improved speed control attachment which is provided with a lock for locking the speed control attachment in any desired setting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is an enlarged fragmentary sectional view taken through the instrument panel and shows the specific details of the means for adjusting the speed control attachment, a lock illustrated in Figure 1 being omitted for purposes of clarity;

Figure 7 is an enlarged fragmentary transverse sectional view taken substantially upon the plane indicated by the section line 7—7 of Figure 6 and shows further the details of the adjustable control;

Figure 8 is an enlarged fragmentary sectional view taken substantially upon the plane indicated by the section line 8—8 of Figure 6 and shows the details of a releasable latch for releasing the control means;

Figure 9 is an enlarged fragmentary sectional view taken through the instrument panel and shows in elevation the control means, the control means being provided with a lock;

Figure 10 is an enlarged fragmentary sectional view taken substantially upon the plane indicated by the section line 10—10 of Figure 9 and shows further the details of the lock;

Figure 11 is a fragmentary longitudinal sectional view taken through a modified form of vehicle and shows a slightly modified form of the invention, the basic components of the invention being changed to be mounted on the fuel control link thereof;

Figure 1:
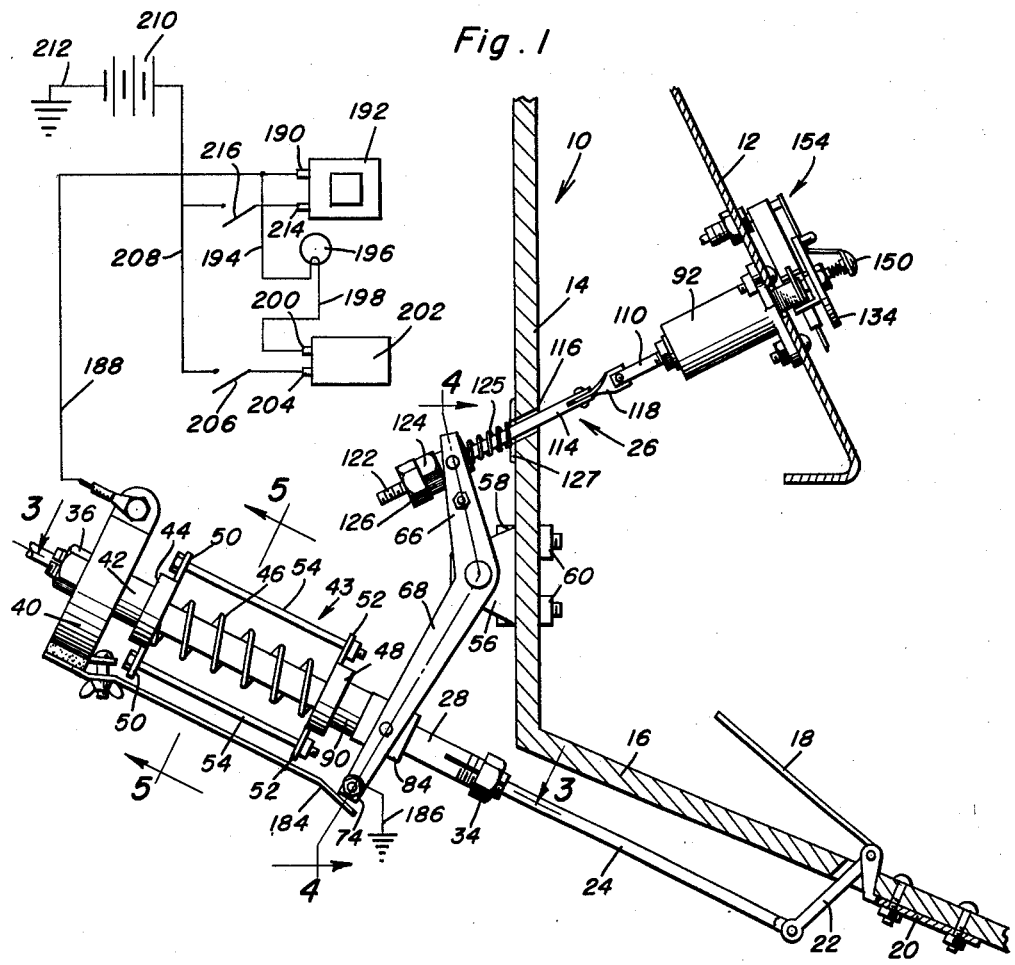
Figure 1 is a vertical sectional view taken through a fire wall and a floor board of the vehicle and shows attached thereto a speed control attachment which is the subject of this invention.

Figure 12 is a fragmentary transverse vertical sectional view taken substantially upon the plane indicated by the section line 12—12 of Figure 11 and shows the manner in which various components of the linkage are mounted and connected together; and Figure 13 is an enlarged transverse vertical sectional view taken substantially upon the plane indicated by the section line 13—13 of Figure 11 and shows the manner in which the invention is attached to the fuel control link.

Referring now to the drawings in detail, it will be seen that there are illustrated portions of a vehicle which are referred to in general by the reference numeral 10. The vehicle 10 includes an instrument panel 12, a fire wall 14 and a floor board 16. Suitably mounted on the floor board 16 for pivotal movement is a gas pedal or an accelerator pedal 18 which is carried by a mounting bracket 20 secured to the floor board 16. Connected to the pedal 18 is a crank 22 which is in turn connected to a fuel control link 24.

In the normal operation of the vehicle 10, the accelerator pedal 18 is depressed to move a fuel control link 24 to the right, as is viewed in Figure 1. The movement of the fuel control link 24 actuates a carburetor control (not shown) and governs the fuel supply to an internal combustion engine (not shown) for the vehicle 10. This for all practical purposes controls the speed of the vehicle 10.

Figure 3:
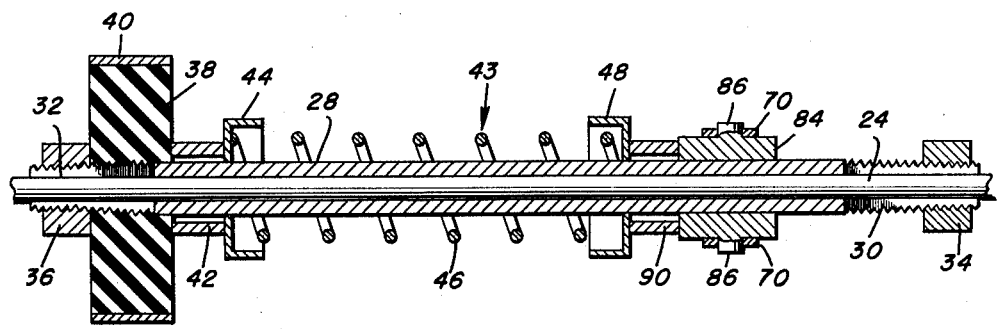
Figure 3 is an enlarged fragmentary longitudinal sectional view taken substantially upon the plane indicated by the section line 3—3 of Figure 1 and shows the specific details of the resiliently mounted stop and the manner in which it is adjustably mounted on a fuel control link.

Carried by the vehicle 10 is the speed control attachment which is the subject of this invention, the speed control attachment being referred to in general by the reference numeral 26. The speed control attachment 26 includes a mounting member in the form of an elongated sleeve 28 which is telescoped over the fuel control link 24, as is best illustrated in Figures 1 and 3. The sleeve 28 includes threaded collet portions 30 and 32 at opposite ends thereof. The collet portions 30 and 32 are provided with clamping nuts 34 and 36, respectively, which clamp the sleeve 28 on the fuel control link 24 in an adjusted position. The nut 36 functions as a stop for an insulating block 38 which is clamped on the sleeve 28 by means of a clamp 40. The purpose of the clamp 40 will be set forth in more detail hereinafter. Abutting the insulating block 38 is a spacer collar 42.

Slidably mounted on the sleeve 28 is a spring unit which is referred to in general by the reference numeral 43. The spring unit is disposed in telescoped relation with respect to the sleeve 28 and includes a cup shaped retaining member 44 which bears against the spacer collar 42. Telescoped over an intermediate portion of the sleeve 28 and seated in the cup shaped member 44 is a spring 46. Slidably carried by the sleeve 28 in opposed relation to the cup shaped member 44 is a second cup shaped member 48 which is disposed over the opposite end of the spring 46. The cup shaped member 48 will for the purpose of this invention be considered a stop element.

Figure 5:
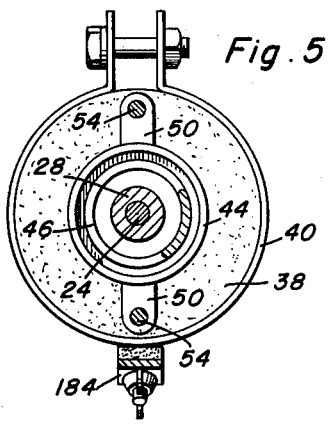
Figure 5 is an enlarged fragmentary transverse sectional view taken substantially upon the section line 5—5 of Figure 1 and shows further the details of the mounting of the resiliently mounted stop.

Referring now to Figures 1 and 5 in particular, it will be seen that the cup shaped member 44 is provided with ears 50. The cup shaped member 48 is provided with similar ears 52. Extending between the ears 50 and 52 and slidable therein are clamp rods 54 for retaining the cup shaped members 44 and 48 in alignment. The rods 54 are adjustable in length so that the cup shaped members 44 and 48 will clamp the spring 46 therebetween to preload the spring 46 a desired amount. This will give the spring 46 a predetermined resistance.

Secured to the fire wall 14 is a U-shaped mounted bracket 56 which is clamped in place by means of a clamp block 58 and fasteners 60. Pivotally connected to the mounting bracket 56 by means of a pivot pin 62 is a bell crank which is referred to in general by the reference numeral 64. The bell crank 64 includes an upper arm 66 and a lower arm 68, the lower arm 68 to be considered a stop arm.

Figure 4:
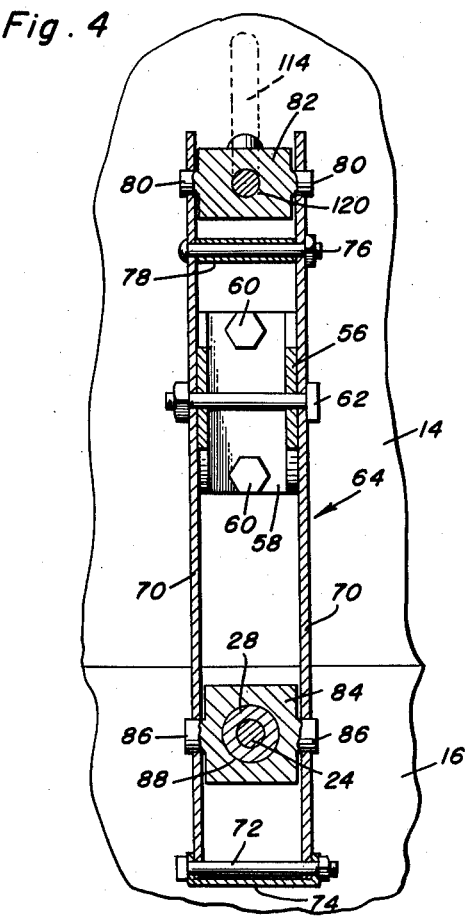
Figure 4 is an enlarged fragmentary sectional view taken substantially upon the plane indicated by the section line 4—4 of Figure 1 and shows the specific details of a stop arm pivotally mounted on the fire wall.

As best illustrated in Figure 4, the bell crank 64 is formed by a pair of side plates 70 which are connected together at their lower ends by a bolt 72 carrying a clamp member 74. The upper ends of the plates 70 are connected together by a bolt 76 carrying an intermediate spacer 78. Mounted between the upper ends of the plates 70 is a connecting block 82 having trunnions 80 pivotally journaled in the plates 70. A similar connecting block 84 is positioned between the lower portions of the plates 70 and is pivotally mounted therebetween by means of trunnions 86.

The connecting block 84 serves to position the stop arm 68 with respect to the stop element which is formed by the cup shaped member 48. The connecting block 84 is provided with a bore 88 disposed transversely of the axes of the trunnions 86. Positioned in the bore 88 for longitudinal sliding movement is the sleeve 28. As is best illustrated in Figure 3, disposed between the connecting block 84 and the cup shaped member 48 is a spacing collar 90 of a desired length.

Referring now to Figures 1 and 6 in particular, it will be seen that there is secured to the forward face of the instrument panel a mounting sleeve 92. The mounting sleeve 92 is provided at its rear end with radiating mounting ears 94 through which pass suitable fasteners 96. The forward end of the mounting sleeve 92 is closed by an end member 98 which has a centrally located internally threaded bore 100.

Threadedly engaged in the internally threaded bore 100 is an externally threaded sleeve 102. The sleeve 102 is provided with a square cross sectional opening 104 therethrough. Slidably received in the sleeve 102 is a square cross-sectional member 106 which is provided at the forward end thereof with an internally threaded bore 108 receiving a threaded end of a control rod 110. The control rod 110 is locked in an adjusted position with respect to the member 106 by means of a lock nut 112. The lock nut 112 also serves to limit the rearward movement of the control rod 110 and the member 106. Referring now to Figure 1 once again, it will be seen that the control rod 110 has a forward section 114 passing through an opening 116 in the fire wall 14. The control rod 110 is connected to the forward section 114 by means of a universal fitting 118. The section 114 passes through a bore 120 in the connecting block 82. The lower end of the section 114 is externally threaded as at 122 and is provided with a suitable stop nut 124 and a lock nut 126.

In order to prevent rattling of various components of the speed control attachment, there is disposed on the forward section 114 of the control rod 110 and forwardly of the fire wall 14 an elongated spring 125. Closing the forward end of the opening 116 is a washer 127 through which the forward section 114 passes. The spring 125 is normally in a compressed state and bears against the washer 127 and the connecting block 82. The spring 125 takes up all of the slack in the linkage of the attachment and prevents rattling thereof.

In order that the control rod 110 may be shifted with respect to the mounting sleeve 92 to control the positioning of the stop arm 68, the rear end of the member 106 is provided with an internally threaded bore 128. Threadedly engaged in the bore 128 is an externally threaded sleeve 130 having a bore 132 therethrough. Secured to the sleeve 130 in adjusted position is a dial 134, the dial being retained in adjusted position by being threadedly engaged on the sleeve 130 and locked in place by suitable lock nuts 136. By rotating the dial 134, the member 106 is rotated, the sleeve 130 being locked to the member 106 by a lock nut 138, and the sleeve 102 is rotated. This results in the feeding of the sleeve 102 through the mounting sleeve 92 to control movement of the control rod 110.

In the operation of those components of the speed control device 26 described hereinabove, with the various parts being properly adjusted with respect to the elements on which they are mounted, the stop element 48 is so positioned whereby it forces the spacing collar 90 against the connecting block 84 of the stop arm 68 when the fuel control link 24 has been moved a distance to normally obtain a predetermined speed. Thus by the normal manipulation of the accelerator pedal 18, a maximum predetermined speed is determined. The limiting of the movement of the fuel control link 24 permits the operator of the vehicle 10 to rest his foot on the pedal 18 in a comfortable manner and at the same time maintain the maximum set speed. In the event of an emergency, the accelerator pedal 18 may be pushed very hard with the result that the spring 46 will be compressed or overridden and the fuel control link 24 may move further to permit the increased speed. The maximum speed of the vehicle 10 is determined by the setting of the stop arm 68 which is in turn controlled by rotating the dial 134 in a manner described hereinabove.

Referring once again to Figure 6 in particular, it will be seen that there is provided a longitudinal slot 140 in an intermediate portion of the member 106. Pivotally mounted on a pin 142 is a generally Z-shaped lock 144 having an end 146 engaging the rear end of the sleeve 102. The lock 144 normally prevents the forward sliding of the member 106 through the sleeve 102.

Slidably extending through the bore 132 of the sleeve 130 is a rod 148 whose forward end is connected to the latch member 144. The rod 148 is provided at its rear end with a suitable control knob 150. The rod 148 is retained in a latch setting position by means of a spring 152 disposed between the rear end of the sleeve 130 and the control knob 150. When it is desired to release the control for the speed control attachment 26, it is merely necessary to push in on the control knob 150 which will then release the latch member 144. Once the latch member 144 has been moved out of engagement with the sleeve 102, the member 106 and the elements carried thereby may be slid forwardly through the sleeve 102 thereby permitting the stop arm 68 to be moved to an inoperative position. When in this position, the accelerator pedal 18 may be operated in the conventional manner.

The control for the speed control attachment 26 may be locked in a predetermined setting by means of a lock which is referred to in general by the reference numeral 154. The lock 154 includes a ferrule 156 which is positioned in the instrument panel 12 by means of suitable nuts 158 and 160. The lock 154 includes a pin 162 which is selectively positioned in the ferrule 156 and which has connected thereto a lock member 164. The lock member 164 is provided with an intermediate notch 166 and an end notch 168, the notch 168 receiving a reduced forward portion 170 of the control knob 150. Selectively positioned on the dial 134 is a pin 172 which is selectively positioned in the notch 166.

Secured to the pin 162, as is best illustrated in Figure 10, is a bail 174 which has flanges 176 and 178 passing above and below the rear end of the member 106. Passed through the flanges 176 and 178 is a bail 180 of a lock 182. The bail 174 prevents both the withdrawal and rotation of the pin 162. Thus the lock member 164 prevents the release of the control by the use of the control knob 150 and the rotation of the dial 134 in a direction of higher speed. Thus the dial 134 is set by the pin 172 for a maximum speed. If a lower maximum speed is desired, the dial 134 may be rotated out of engagement with the lock member 164. However, this in no way is detrimental to the desired control.

Carried by the clamp 40 is an elongated flexible contact 184 of a switch. The spacer 74 of the bell crank 64 forms the second contact and is grounded by means of a wire 186 connected thereto. The contact 184 is electrically connected to the clamp 40 which is provided with a wire 188. The wire 188 is connected to a first terminal 190 of a buzzer 192. Connected to the wire 188 is a wire 194 whose opposite end is connected to a lamp 196. Connected to the opposite terminal of lamp 196 is a wire 198 which is connected to a terminal 200 of a flasher element 202. The flasher element 202 is provided with a second terminal 204 which is connected to a switch 206 which is in turn connected by a wire 208 to a battery 210 of the vehicle 10. The battery 210 is grounded in the conventional manner by a wire 212. The buzzer 192 includes a second terminal 214 which is connected through a switch 216 to the wire 208.

During the normal operation of the vehicle, the spacer 74 remains out of contact with the contact 184. However, when the spring 46 is overridden, the spacer 74 engages the contact 184 which is adjustable to complete the circuit between the wire 188 and the ground wire 186 after a predetermined percentage of over speed. When the switches 206 and 216 are closed, the lamp 196 will continuously flash on and off and the buzzer 192 will operate to indicate to the operator of the vehicle 10 that he is overriding the speed control attachment 26. Either the buzzer 192 or the flasher unit for the lamp 196 may be shut off by utilizing the switches 216 and 206, respectively. However, both units should not be shut off.

Figure 2:
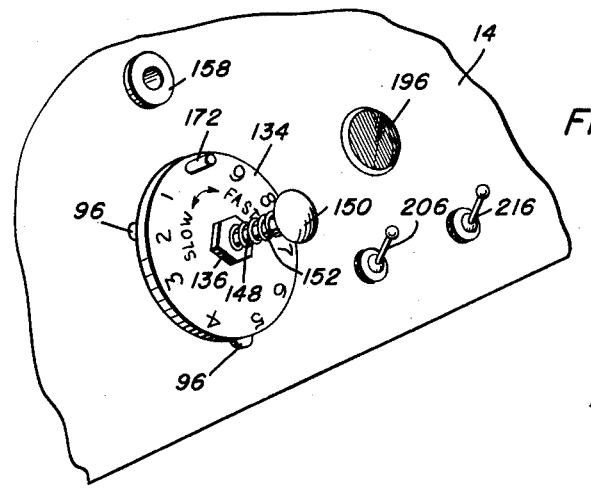
Figure 2 is a fragmentary perspective view of the instrument panel of the vehicle in the vicinity of a portion of the speed control attachment and shows the general arrangement thereof.

Referring now to Figure 2 in particular, it will be seen that the lamp 196 is suitably mounted in the instrument panel 14 adjacent the dial 134. Disposed below the lamp 196 are the switches 206 and 216.

From the foregoing description of the invention, it will be readily apparent that there has been devised a relatively simple speed control attachment which may be attached to existing vehicles without any changes whatsoever in the controls thereof and such speed control attachment is positive in operation and at the same time safe because it is overridable. Further, there is provided suitable lock means for locking the control at a predetermined setting.

From the foregoing description of the speed control attachment it will be readily apparent that it may be attached on all types of existing cars although minor changes may be necessary in certain of the fittings. Once the speed control attachment has been mounted on vehicles, it will permit the owner of the vehicle to determine the maximum speed which the vehicle may be driven under normal operating conditions and at the same time will not preclude an increase in the speed over the preset maximum when it is necessary. Contrary to the action of a conventional governor, the present invention permits the full control of a vehicle with a maximum throttle setting being permissible. The speed control merely makes it uncomfortable for one to maintain a speed in excess of the preset maximum. This is because of the unit which includes the spring 46. The spring 46, while it is compressible to permit the throttle linkage to be moved a distance beyond that normally set by the speed control attachment, is of such a size whereby it is difficult for one to maintain the spring in a compressed state for a long period of time.

The speed control attachment is so constructed whereby the maximum speed desired may be easily set with the dial, the dial being of such a nature whereby one revolution thereof increases the maximum speed approximately 10 miles per hour. Accordingly, once the speed control attachment has been properly synchronized to the throttle linkage of a vehicle, one can automatically dial the maximum speed which he desires to maintain and may then operate the vehicle depressing the accelerator pedal until it comes to a normal stop position where the accelerator pedal functions more as a foot rest than for the purpose of controlling the vehicle when the maximum speed is being maintained. Thus the foot pedal because of the stop means therefor actually functions as a comfortable foot rest.

By controlling the maximum speed of a vehicle without detrimentally controlling the driver's control over the vehicle, one may determine the maximum speed which he desires to travel, this being set in many cases by law. By doing so, speed tickets may be avoided as well as the undesirable consequences which in many instances go with over speed, such as accidents and the like.

Although one is readily warned of the exceeding of the predetermined maximum speed set with the speed control attachment by the extra pressure required to depress the accelerator pedal, the invention is also provided with a suitable warning device, here in the form of the light or the buzzer described above which will immediately warn the operator of a vehicle and all passengers in the vehicle after he has exceeded the preset speed by a predetermined percentage, the switch for controlling the warning device being of an adjustable type.

Referring now to Figure 11 in particular, it will be seen that there is illustrated a portion of a modified form of vehicle which is referred to in general by the reference numeral 220. The vehicle 220 includes a fire wall 222 which terminates at its lower end in a floor board 224. The vehicle 220 will also include a carburetor 226 having a control butterfly 228 mounted on a transverse shaft 230 to which there is connected an operating lever 232. Pivotally connected to the operating lever 232 is a fuel control link 234 whose rear end is connected to a lever 236. The lever 236 is mounted intermediate its ends on a transverse pivot 238 carried by a mounting bracket 240 mounted on the fire wall 222.

Pivotally secured to the floor board 224 by means of a bracket 242 is a fuel control pedal or accelerator pedal 244. The accelerator pedal 244 has connected thereto an actuating lever 246 which has connected thereto a link 248. The link 248 extends between the lever 246 and the lever 236 and is connected to the two.

In order to limit movement of the control link 234, there is mounted on the fire wall 222 a slightly modified form of speed control attachment which is referred to in general by the reference numeral 250. The speed control attachment with minor exceptions is very similar to the speed control attachment 26 and operates in the same manner.

The speed control attachment 250 includes a horizontally disposed arm 252 which is provided at its rear end with a mounting bracket 254 suitably secured to the fire wall 222. Pivotally mounted on the forward end of the arm 252 is a depending stop arm which is referred to in general by the reference numeral 256. The stop arm 256 includes a pair of side plates 258 which are disposed on opposite sides of the arm 252 and are pivotally connected thereto by a transverse pivot pin 260. The side plates 258 are further connected together by a transverse bolt 262 disposed intermediate the ends thereof. Carried by the bolt 262 is a spacer 264 which is disposed between the side plates 258.

Positioned between the plates 258 below the spacer 264 is a connecting block 266 which corresponds to the connecting block 82. The connecting block 266 is provided with trunnions 268 which are journaled in the side plates 258 so as to pivotally mount the connecting block 266.

Extending through an opening 270 in the fire wall 222 is the forward section 114 of the control rod 110. Closing the forward part of the opening 270 is the washer 127 through which the forward section 114 passes. Extending between the connecting block 266 and the washer 127 is the coil spring 125, the coil spring 125 being telescoped over the forward section 114 and being disposed in slightly compressed relation.

Positioned between the lower ends of the side blocks 258 is a connecting block 270 which corresponds to the connecting block 84. The connecting block 270 is provided with trunnions 272 which are journaled in the side plates 258. Slidably extending through the connecting block 270 is a mounting member 274 which is in the form of an elongated rod and which corresponds to the sleeve 28.

The extreme rear end of the mounting member 274 is provided with a stop nut 276 and a lock nut 278. Disposed in engagement with the stop nut 276 is the insulator block 38 which is clamped on the mounting member 274 by means of the clamp 40.

Positioned adjacent the clamp 40 is a spacer collar 280 which corresponds to the spacer collar 42. A second spacer collar 282, corresponds to the spacer collar 90. Disposed between these spacer collars 280 and 282 is the spring unit 43.

Disposed at the forward end of the mounting member 274 is a fitting which is referred to in general by the reference numeral 284. The fitting 284 includes a U-shaped lower portion 286 in which there is adjustably positioned the fuel control link 234, the fuel control link 234 being clamped in place by a fastener 288. The fitting 284 also includes an upstanding flange 290 which has received thereover a bifurcated end 292 of the mounting member 274. The bifurcated end 292 is pivotally connected to the flange 290 by means of a pivot pin 294.

It is to be noted that the flexible contact 184 of the clamp 40 is disposed intermediate the lower ends of the side plates 258. The side plates 258 are provided with insulating bushings 296 which carry a bolt 298, the bolt 298 extending between the side plates 258. Mounted on the bolt 298 in electrical contact therewith is a roller contact 300. The contact 300 extends between the side plates 258 and forms a spacer therefor. Carried by the bolt 298 is a terminal 302. The contact 300 is engaged with the flexible contact 184 to complete a circuit for the signal part of the invention.

It is to be understood that all of the other components of the attachment 220 will be identical with those of the attachment 26. The operation of the attachment 220 will be identical with that of the attachment 26. The only difference between the two attachments is that the attachment 220 is intended for mounting on one type of vehicle whereas the attachment 26 is intended for mounting on an entirely different type of vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A speed control device for automotive vehicles of the type including an accelerator pedal and a fuel control link connected to said pedal, said speed control device comprising a mounting member connected to said fuel control link, a stop element carried by said mounting member, a stop arm positioned in alignment with said stop element and engageable therewith to limit movement of said fuel control link, means for selectively positioning said stop arm, said means including a fixed support, a control rod carried by said fixed support and connected to said stop arm, control means for selectively positioning said control rod relative to said support, and manual release means for releasing said control means, said control means including first and second elements disposed in longitudinal telescopic driving engagement, a latch member pivotally carried by one of said elements and abutting the other of said elements for limiting longitudinal relative movement of said first and second elements, said manual release means including linkage connected to said latch member for moving said latch member to an inoperative position.

2. A speed control device for automotive vehicles of the type including an accelerator pedal and a fuel control link connected to said pedal, said speed control device comprising a mounting member connected to said fuel control link, a stop element carried by said mounting member, a stop arm positioned in alignment with said stop element and engageable therewith to limit movement of said fuel control link, and means for selectively positioning said stop arm, said means including a fixed support, a control rod carried by said fixed support and connected to said stop arm, and control means for selectively positioning said control rod relative to said fixed support, said control means including a stop member adjustably carried by said fixed support, means connected to said stop member for manually varying the position of said stop member relative to said fixed support, a projecting lock carried by said control rod and engaging said stop member for limiting movement of said control rod, and means connected to said lock for moving said lock out of alignment with said stop member to release said control rod and render the speed control device inoperative.

3. A speed control device for automotive vehicles of the type including an accelerator pedal and a fuel control link connected to said pedal, said speed control device comprising a mounting member connected to said fuel control link, a stop element carried by said mounting member, a stop arm positioned in alignment with said stop element and engageable therewith to limit movement of said fuel control link, and means for selectively positioning said stop arm, said means including a fixed support, a control rod, a rotatable connection between said control rod and said stop arm, and control means for selectively positioning said control rod relative to said fixed support, said control means including a tubular stop member threadedly supported by said fixed support, a fitting secured to said control rod remote from said stop arm, said fitting extending through said stop member having a relative sliding connection therewith, a control member secured to said fitting for manually rotating said fitting and said stop member to vary the position of said stop member relative to said fixed support, a lock pivotally supported by said fitting and engaged with said stop member to limit sliding movement of said fitting relative to said stop member and movement of said control rod relative to said support, and manually operable means carried by said fitting and connected to said fitting for disengaging said lock from said stop member to release said control rod.

4. A speed control device as specified in claim 1 wherein said stop element is slidably mounted on said mounting member, a spring slidably mounted on said mounting member for normally limiting movement of said stop element, a retaining member spaced from said stop element at the opposite end of said spring, means separate and apart from said mounting member connecting together said retaining member and said stop element with said spring being precompressed therebetween whereby said stop element, said spring and said retaining member form a preloaded unit irrespective of said mounting member to assure the proper action of said spring.

5. A speed control device as specified in claim 1 wherein said mounting member is in the form of an elongated sleeve having a collet type clamp at one end thereof for adjustably fixedly securing said mounting member on said fuel control link, said stop element is slidably mounted on said mounting member, a spring is slidably mounted on said mounting member for normally limiting movement of said stop element, a retaining member is spaced from said stop element at the opposite end of said spring, means exclusive of said mounting member connecting together said retaining member and said stop element with said spring being precompressed therebetween whereby said stop element, said spring and said retaining member form a preloaded unit irrespective of said mounting member to assure the proper action of said spring.

References Cited in the file of this patent
UNITED STATES PATENTS

| | | |
|---|---|---|
| 625,749 | Ellstrom | May 30, 1899 |
| 631,427 | Lantz | Aug. 22, 1899 |
| 2,104,649 | Hinton | Jan. 4, 1938 |
| 2,145,665 | Rodgers | Jan. 31, 1939 |
| 2,171,401 | McCoy | Aug. 29, 1939 |
| 2,186,620 | Aprea et al. | Jan. 9, 1940 |
| 2,295,897 | Gillespie | Sept. 15, 1942 |
| 2,506,940 | Ryder | May 9, 1950 |
| 2,509,274 | Nugey | May 30, 1950 |
| 2,661,941 | Smith | Dec. 8, 1953 |
| 2,677,733 | Haley | May 4, 1954 |
| 2,692,980 | Platt | Oct. 26, 1954 |
| 2,822,702 | Sheppe | Feb. 11, 1958 |